US006362819B1

(12) United States Patent
Dalal et al.

(10) Patent No.: US 6,362,819 B1
(45) Date of Patent: Mar. 26, 2002

(54) TEXTURE TESSELLATION FOR THREE-DIMENSIONAL MODELS

(75) Inventors: Ketan K. Dalal, Seattle; Colin D. McCartney, Kirkland, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/174,083

(22) Filed: Oct. 16, 1998

(51) Int. Cl.$^7$ .............................................. G06F 15/00
(52) U.S. Cl. ...................................................... 345/423
(58) Field of Search ................................ 345/423, 419, 345/426, 427, 428, 433, 114, 115

(56) References Cited

U.S. PATENT DOCUMENTS 5,748,865 A * 5/1998 Yamamoto et al. ......... 345/423

* cited by examiner

*Primary Examiner*—Phu K. Nguyen
(74) *Attorney, Agent, or Firm*—Christensen O'Connor Johnson Kindness PLLC

(57) ABSTRACT

A method, system and computer-readable medium for tessellating textures and mapping the resulting texture fragments onto the surface geometries of a three-dimensional model is disclosed. First, a texture is fragmented into texture fragments based on rasterization requirements. Then, the corresponding surface geometry of the three-dimensional model is fragmented so as to correspond to the texture fragments and each texture fragment is mapped to a corresponding surface geometry fragment. This process is repeated for each viewable geometric surface of the three-dimensional model that is to be textured. Thereafter, the three-dimensional model is displayed with the texture fragments mapped to the surface geometries. Prior to the mapping, the polygons, e.g., triangles, that define the surface geometries that are divided by the boundaries between texture image fragments are reconstituted as new, smaller triangles.

12 Claims, 13 Drawing Sheets

TEXTURE TESSELLATION FOR THREE-DIMENSIONAL MODELS

FIELD OF THE INVENTION

This invention relates to computer-generated composite documents and, more particularly, to mapping computer-generated composite documents as textures to three-dimensional models.

BACKGROUND OF THE INVENTION

A displayed three-dimensional model is typically rendered by a processor according to predefined coordinates in a predefined three-dimensional space. In order to appear as a displayed solid three-dimensional model, a texture or textures are mapped to the surface of the three-dimensional model. One example of a texture is a repetitive pattern. Other examples of textures are markup documents that may be formatted to include one or more Joint Photographic Experts Group (JPEG), Graphics Interchange Format (GIF), Moving Pictures Experts Group (MPEG), two-dimensional animation, RealVideo, hypertext markup language (HTML) images.

Virtually all 3D rasterization engines (whether implemented in hardware of software) require that textures be a power of two in width and height. Further, some rasterization engines require that the texture be square. Even further, some rasterization engines have maximum size limitations, i.e., some engines cannot render textures that are larger than 1024 by 1024 pixels. If a client of the 3D rasterization engine, such as a three-dimensional modeling application, requires that a non-conforming source image be used as a texture, something has to be done. For example, if a three-dimensional modeling application requires a 200 by 300 pixel texture, the application is required to make some choices in order to meet the requirements or limitations of the rasterization engine. In the past, the three-dimensional modeling application's choice was to either scale the texture down to 128 by 256 pixels (or 128 by 128 pixels) or scale the texture up to 256 by 512 pixels (or 512 by 512 pixels). Both techniques (scale up or scale down) have serious penalties (performance+image quality). Using a larger texture size has the obvious disadvantage of wasting memory. Also, if the application runs into a texture maximum size limit, in the past, the only choice was to scale down.

In some applications, scaling has other disadvantages. For example, if the texture image is to be mapped to an animated three-dimensional model using the MPEG format, each texture image in the animation sequence must be scaled. Since animation requires 30 or more frames per second, conventional rasterization engines would have a difficult if not impossible time performing the texture scaling required for displaying an animation sequence in real time.

Many hardware-implemented 3D rasterization engines require that the texture that is used be stored in video memory. Video memory is a very scarce resource. Video memory is much smaller than main memory and is used for many purposes other than textures, i.e., screen buffer, back buffer, and zbuffer. If a large texture is to be applied to a geometric surface defined by a mesh of polygons, such as triangles, there may not be enough room in video memory for the texture when the mesh is rendered. At present there are two ways to solve this problem. The first is to scale down the texture so that it fits into video memory. The second is to not use the hardware-implemented 3D rasterization engine and use a software engine instead. The first solution results in a low-quality image. Further, scaling down the texture may degrade performance. The second solution decreases performance speed when compared to hardware-implemented 3D rasterization.

Therefore, there exists a need for a new and improved method for efficiently mapping texture to the geometric surfaces of three-dimensional models. The present invention is directed to meeting this need.

SUMMARY OF THE INVENTION

In accordance with this invention, a method, system and computer-readable medium for tessellating textures and mapping the resulting texture fragments onto the geometric surfaces of a three-dimensional model are provided. First, the texture for a predetermined surface of the three-dimensional model is fragmented into texture fragments such that each fragment conforms to rasterization requirements. Next, the surface geometry of the associated surface of the three-dimensional model is fragmented based on the texture fragments. Then, each texture fragment is mapped to the corresponding surface geometry fragment. This process is repeated for each viewable surface of the three-dimensional model to be textured. After completion, the three-dimensional model with the texture images mapped to the geometric surfaces of the three-dimensional model is displayed.

In typical 3D rendering engines, the surface geometries of three-dimensional models are defined by meshes of polygons, the most typical polygon being a triangle. For a particular surface, e.g., the outside of a sphere, there may be many such triangles. In accordance with other aspects of this invention, each polygon, i.e., each triangle in the surface geometry is assigned to exactly one of the texture fragments; hence, the collection of triangles assigned to a particular texture fragment conforms to the associated geometry fragment.

In accordance with further aspects of this invention, a polygon, i.e., a triangle in the surface geometry that falls within two (or more) texture fragments, is subdivided into smaller polygons, i.e., triangles, sized such that each small triangle can be independently assigned to exactly one of the texture fragments. The texture coordinates for each vertex of a polygon (a triangle) are assigned to a particular texture fragment. The texture coordinates for each vertex are transformed based on the location of the texture fragments with respect to the original texture.

As will be readily appreciated from the foregoing summary, the invention provides a new and improved method, apparatus and computer-readable medium for tessellating textures and mapping the resulting texture fragments onto the geometric surfaces of a three-dimensional model. When employed in a 3D rendering system that is designed to render three-dimensional models whose geometric surfaces are defined by a mesh of polygons, the fragmentation algorithm of the invention results in a set of meshes each of which defines a geometric surface fragment that has a smaller texture than the original. By adjusting various parameters (i.e., the maximum width/height), it is possible to create geometric surface fragment meshes whose corresponding texture fragments are fairly small. Then, during rendering, each geometric surface fragment mesh can be rendered sequentially using a minimum of video memory for textures. Sequential rendering of geometric surface fragment meshes allows hardware-implemented 3D rasterization engines to be employed and, thus, the performance benefits of such engines to be obtained.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

In accordance with the present invention, textures are efficiently and effectively mapped to the geometric surfaces of three-dimensional models. The texture associated with each viewable geometric surface of the three-dimensional model is tessellated or broken up into texture fragments such that each fragment conforms to rasterization requirements. The rasterization requirements place limitations on the height and width of a texture. The rasterization requirements are prestored in memory available to a computer system's processor. The corresponding geometric surfaces are fragmented so as to match the texture fragments. Then, the texture information contained in the texture fragments are mapped to their corresponding geometric surface fragments. In implementations of the invention that employ 3D rendering engines that operate on meshes of polygons, such as triangles, that define the geometric surfaces, the polygons, i.e., the triangles, that are divided by the boundaries of the texture fragments are reconstructed as new polygons, i.e., smaller triangles. The texture fragments are associated with the geometric surface fragments and the texture coordinates are remapped to the surface geometry fragments. After the foregoing has been carried out for each viewable surface of the three-dimensional model to be textured, the three-dimensional model with the textures mapped to the geometric surfaces of the model is rendered.

Since the textures are divided into fragments that are compatible with rasterization requirements, no texture stretching is required. Further, memory space is saved since only small texture image fragments sufficient to cover geometric surfaces need to be processed by the 3D rasterization engine. The preferred process for obtaining the benefits of the invention are described in detail below.

Figure 1:
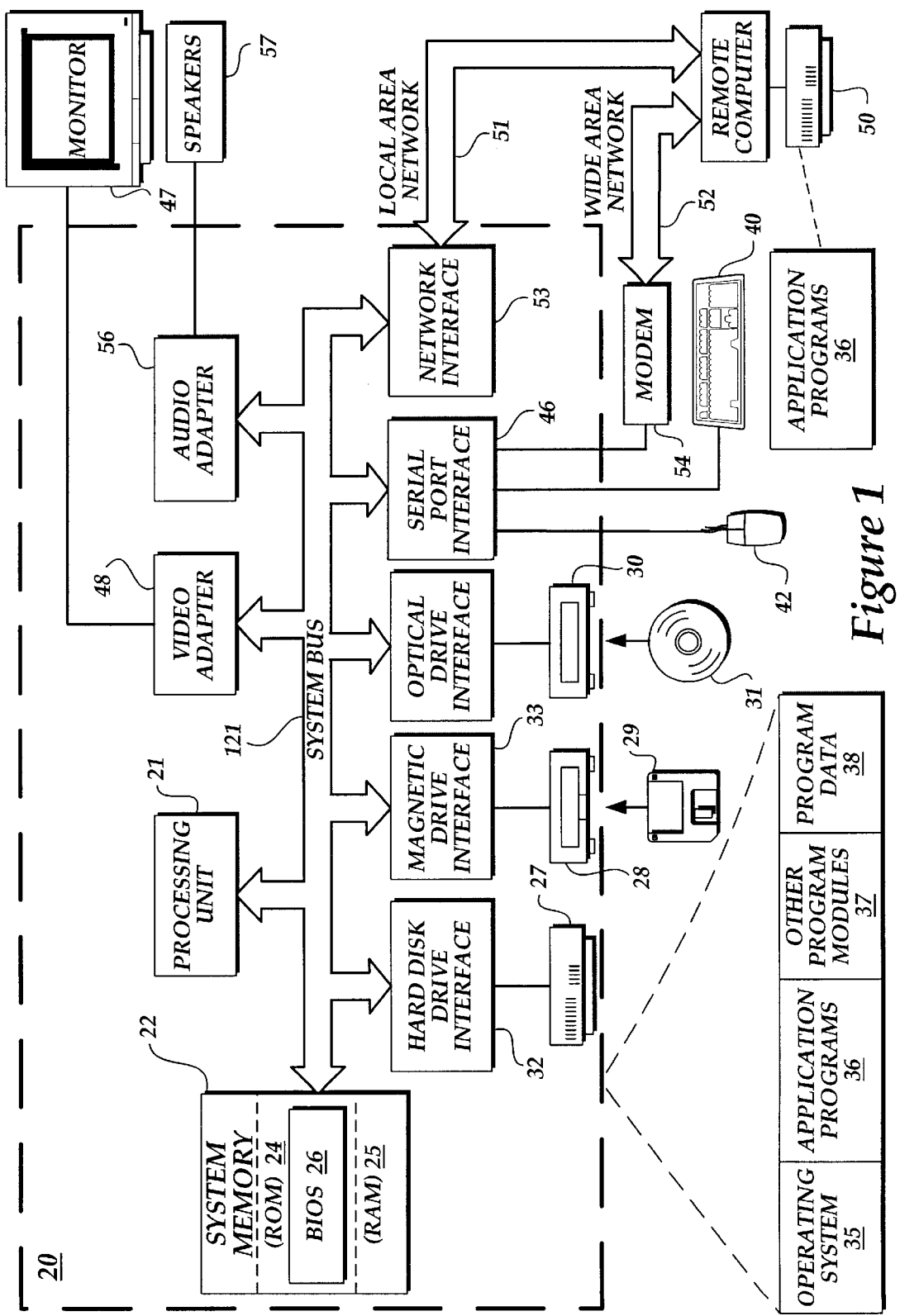
FIG. 1 is a block diagram of a general purpose computer system for implementing the present invention.

FIG. 1 and the following discussion are intended to provide a brief, general description of a suitable computing environment in which the present invention may be implemented. Although not required, the invention will be described in the general context of computer-executable instructions, such as program modules, being executed by a personal computer. Generally, program modules include routines, programs, characters, components, data structures, etc., that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer-readable instructions, data structures, program modules, and other data for the personal computer 20. Although the exemplary environment described herein employs a hard disk, a removable magnetic disk 29, and a removable optical disk 31, it should be appreciated by those skilled in the art that other types of computer-readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may also be connected by other interfaces, such as a parallel port, game port or a universal serial bus (USB). A display in the form of a monitor 47 is also connected to the system bus 23 via an interface, such as a video card or adapter 48. Preferably, the video card or adapter includes a 3D rendering engine implemented in hardware. One or more speakers 57 may also be connected to the system bus 23 via an interface, such as an audio adapter 56. In addition to the display and speakers, personal computers typically include other peripheral output devices (not shown), such as printers.

The personal computer 20 may operate in a networked environment using logical connections to one or more personal computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20 or portions thereof may be stored in the remote memory storage device. It will be appreciated that the network connections shown are exemplary, and other means of establishing a communications link between the computers may be used.

Figure 2:
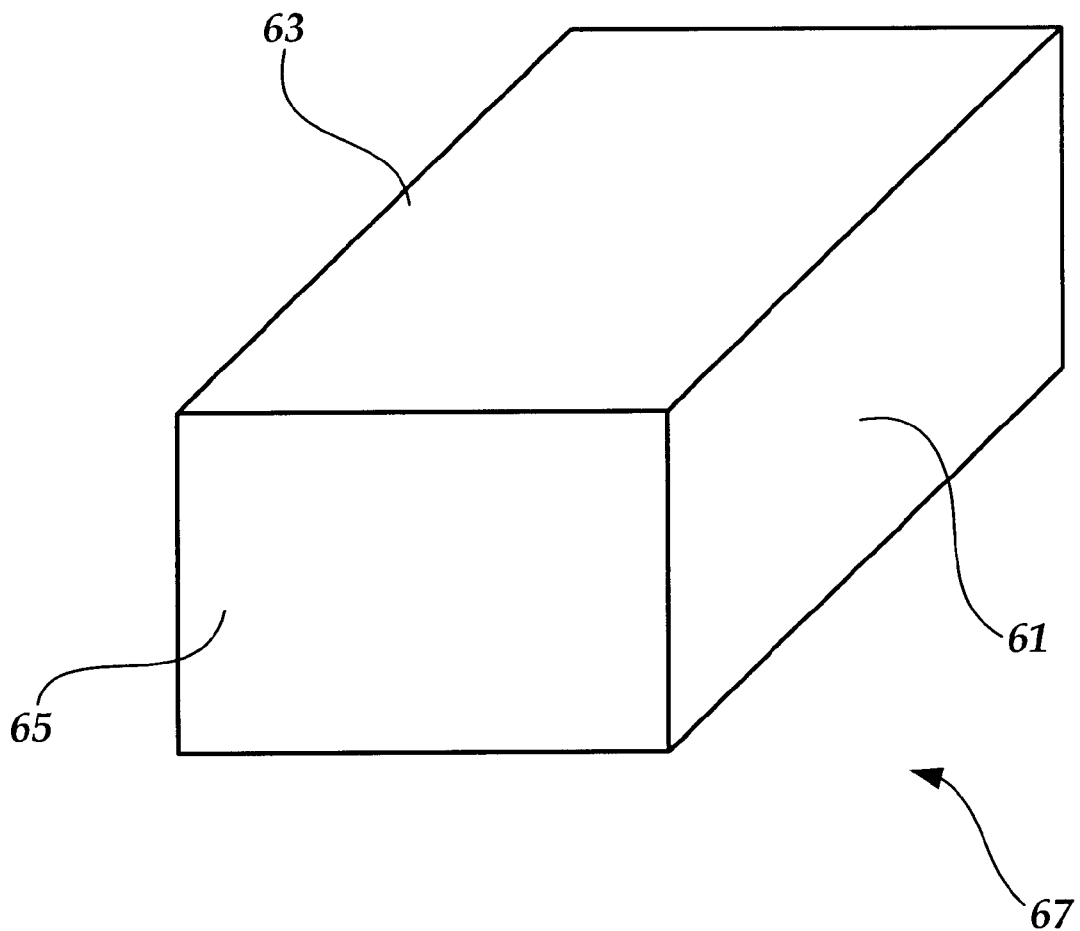
FIG. 2 is an example of a geometric model with which the invention is useful.

The present invention, implemented on a system of the type illustrated in FIG. 1 and described above, efficiently and effectively tessellates textures and maps the resulting texture fragments onto the surface geometries of three-dimensional models, such as the side 61, top 63, and end 65 of the right rectangular parallelepiped 67 illustrated in FIG. 2. As will be better understood from the following description, the textures that correspond to the geometric surfaces of the three-dimensional model are stored in texture image files. The texture image files are constrained by predefined rasterization requirements or rules. The geometric surfaces of the three-dimensional model, i.e., the side 61, top 63, and end 65 surfaces, are defined by a plurality of vertices that form a mesh of polygons, preferably triangles. In a conventional manner, each pixel that results from rendering the mesh of polygons is assigned values, such as color, hue, saturation, luminance, etc., from the corresponding pixel in the texture. In other words, the texture information is mapped to the polygons of the corresponding geometric surface. The coordinates that control the mapping of the texture to the polygons are stored at the vertices of the mesh of polygons and interpolated. The present invention provides an efficient and effective process for assigning or mapping the texture to the corresponding geometric surface.

Figure 3:
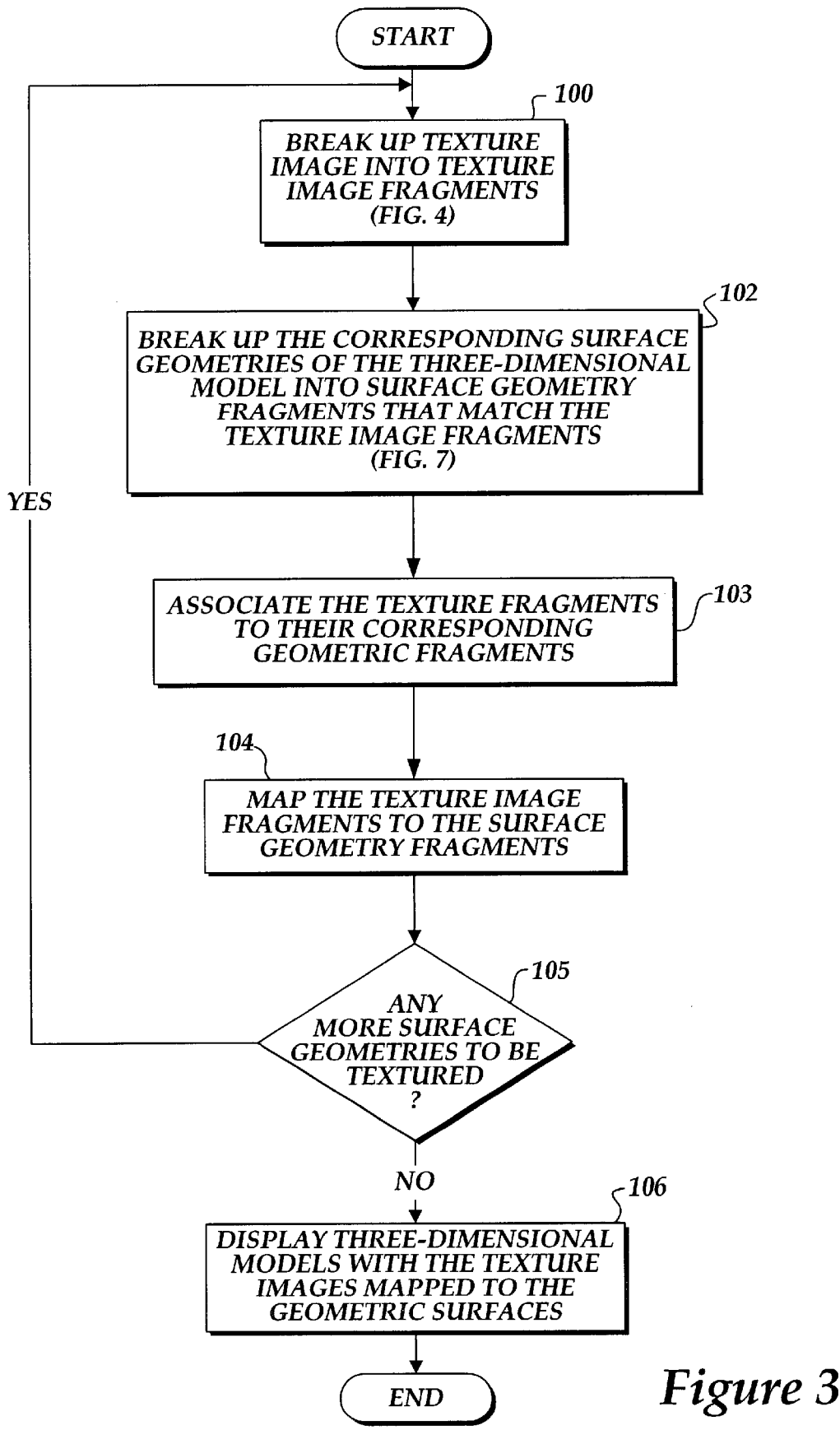
FIG. 3 is a flow diagram illustrating the process of the invention for tessellating textures and for mapping the resulting texture fragments onto the geometrical surfaces of a three-dimensional model.
Figure 4:
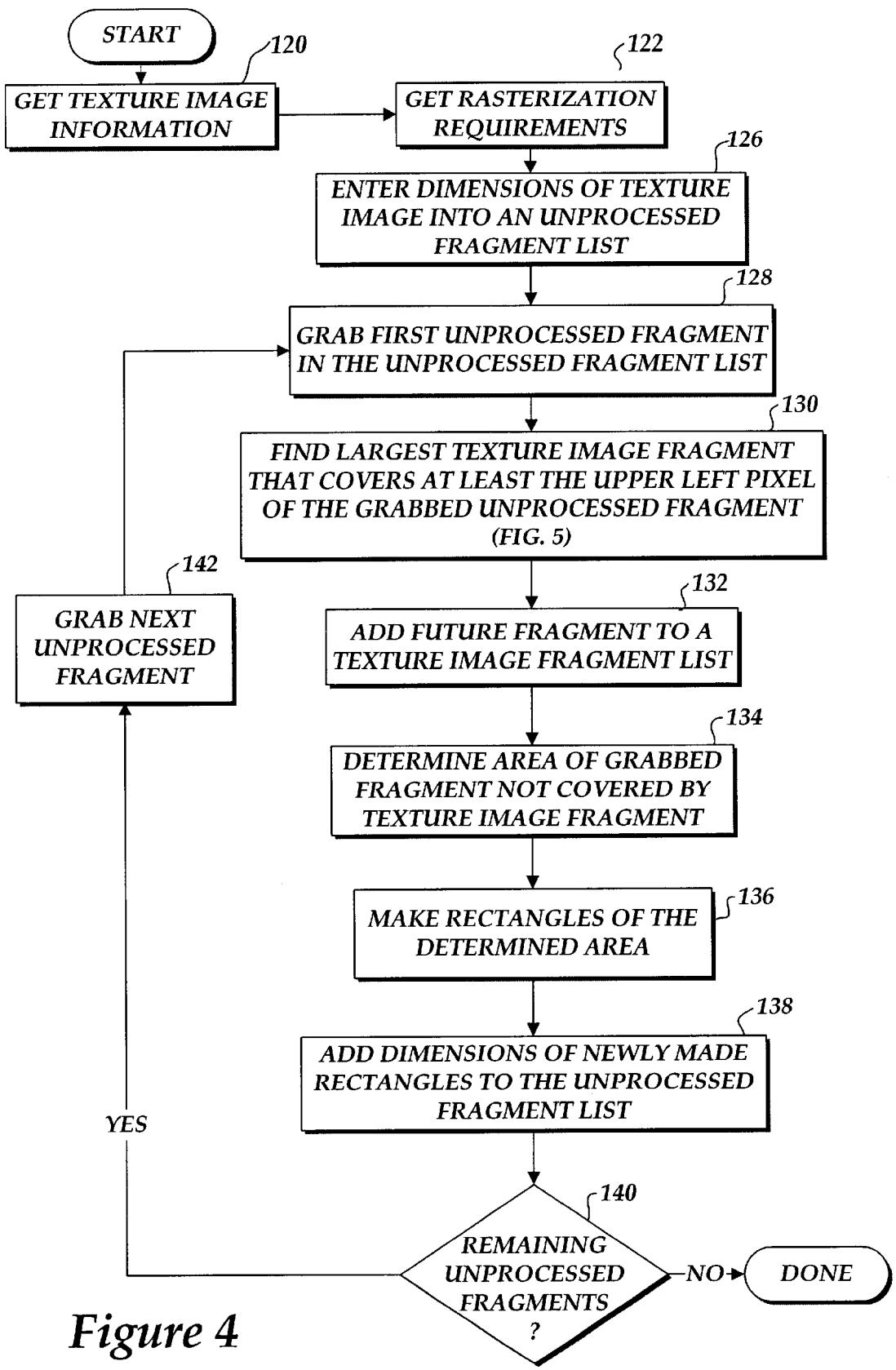
FIG. 4 is a flow diagram illustrating the process of the invention for breaking up a texture into a plurality of texture fragments suitable for use in the process illustrated in FIG. 3.
Figure 7:
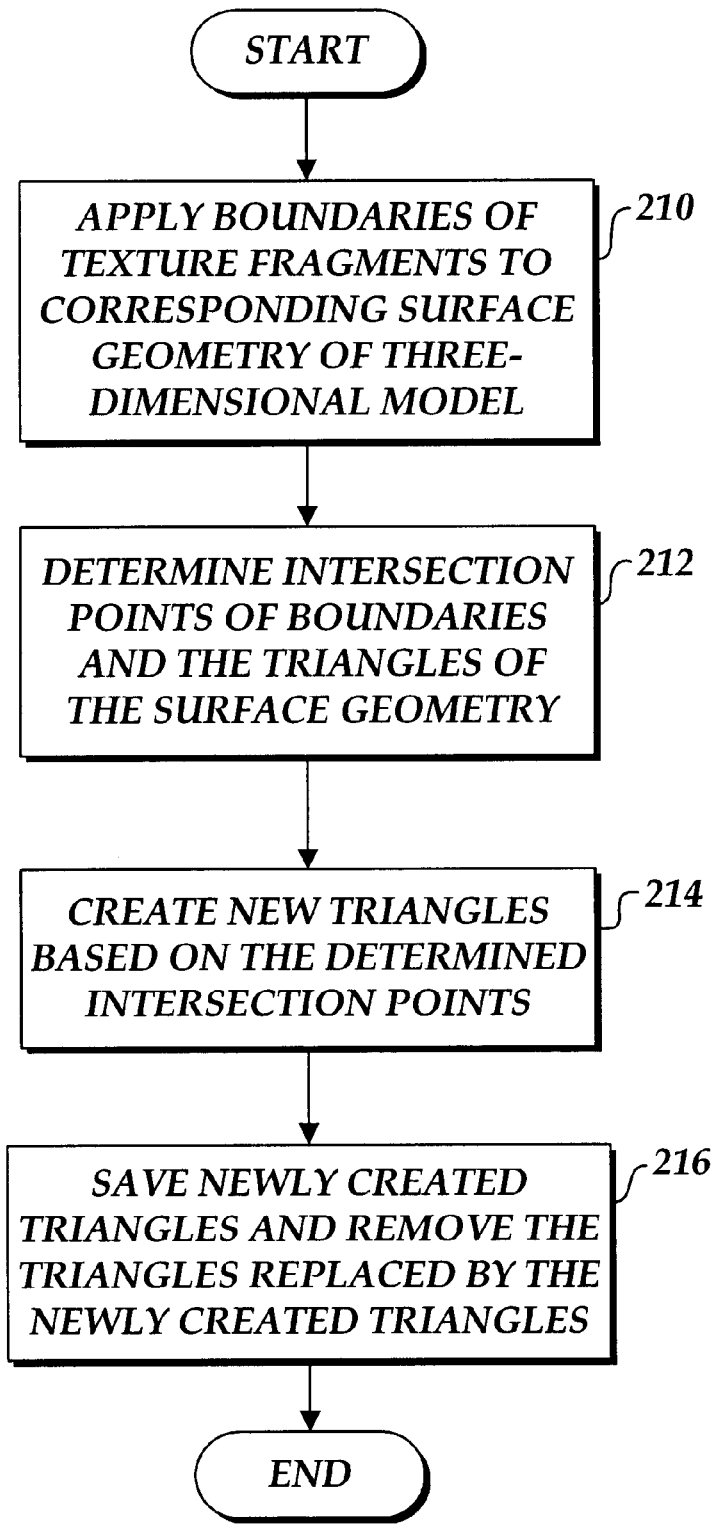
FIG. 7 is a flow diagram illustrating the process of the invention for breaking up corresponding surface geometries of a three-dimensional model into surface geometry fragments that match texture image fragments suitable for use in the process illustrated in FIG. 3.

FIG. 3 is a flow diagram that illustrates the method of the invention for texturing the surfaces of a three-dimensional model, such as the right rectangular parallelepiped shown in FIG. 2. As shown in FIG. 3, a texture associated with one of the geometric surfaces of the three-dimensional model is first broken up into fragments according to the rasterization rules. See block 100. A suitable texture tessellation or fragmentation process is shown in FIG. 4 and described below. Next, at block 102, the corresponding geometric surface is broken up into fragments that correspond to the texture fragments. A suitable surface geometry fragmentation process is shown in FIG. 7 and described below. At block 103, the texture fragments are associated to their corresponding geometric fragments. Then, at block 104, the texture coordinates are remapped to the corresponding geometric surface fragments. At block 105, a test is made to determine if additional geometric surfaces of the three-dimensional model are to be textured. If so, the foregoing sequence is repeated for the next surface. If not, the process proceeds to block 106. At block 106, the three-dimensional model with the textures mapped to the geometric surfaces is rendered, i.e., displayed.

FIG. 4 illustrates a process formed in accordance with this invention for breaking a texture into a plurality of texture fragments (block 100, FIG. 3). First, at block 120, texture information, namely, the dimensions (width and height), of the texture are retrieved and stored. In this regard, it should be noted that any texture, regardless of how it is manipulated for mapping to a geometric surface, can originate as a rectangle having a width and a height. Preferably, the dimension information is stored with other texture information. At block 122, the rasterization requirements or rules are retrieved. The rasterization requirements define the basic rules that must be met in order for texture information to be properly processed during image rendering. Standard rasterization requirements generally include minimum and maximum pixel width and height and that pixel width and height dimensions be equal to a power of two (i.e., 2, 4, 8, 16, 32, 64, etc.). Standard rasterization requirements may also include that the width and height dimensions remain the same, i.e., that the texture be square.

Figure 5:
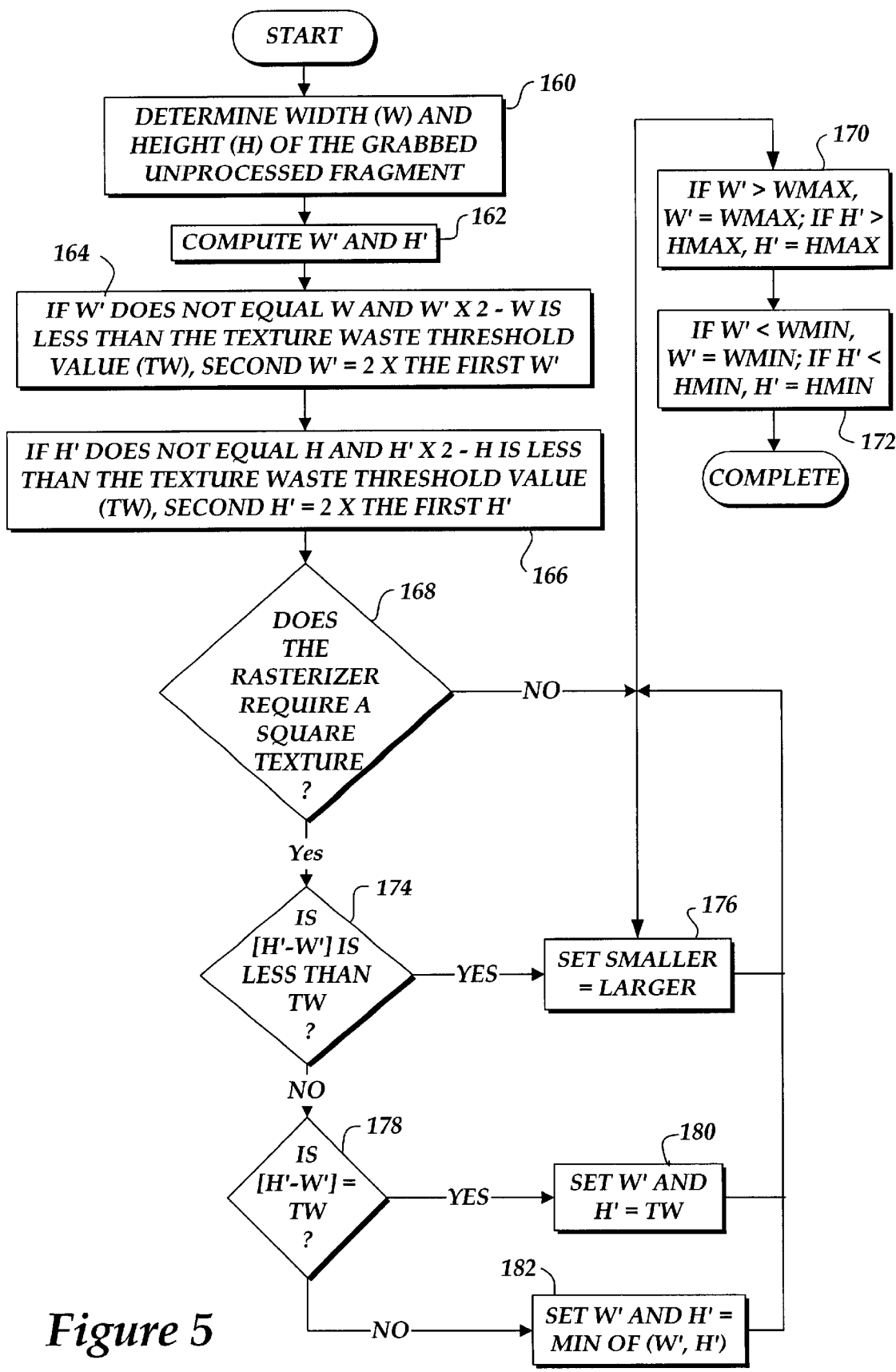
FIG. 5 is a flow diagram illustrating the process of the invention for finding the best texture fragment that covers at least the upper-left pixel of a grabbed unprocessed fragment suitable for use in the process illustrated in FIG. 4.

At block 126, the retrieved dimensions of the texture image are entered into an unprocessed fragment list. Next, at block 128, the first unprocessed fragment in the unprocessed fragment list is grabbed for processing. At this point in the processing cycle, the grabbed fragment is the entire texture. The processor then determines the largest texture fragment that covers at least the upper-left pixel of the grabbed unprocessed fragment based on the retrieved rasterization requirements. See block 130. A suitable process formed in accordance with the invention for finding such a texture fragment is shown in FIG. 5 and described in detail below. The determined texture fragment is added to a texture fragment list. See block 132. Then, the processor determines the area of the grabbed fragment not covered by the texture fragment. See block 134. At block 136, rectangles are made out of the areas not covered by the texture fragment. At block 138, the dimensions of the newly made rectangles are added to the unprocessed fragment list. Then, at block 140, a test is made to determine if all fragments on the unprocessed fragment list have been processed. If not, at block 142, the next unprocessed fragment is grabbed and the process sequence shown in blocks 130–138 is repeated until no more unprocessed fragments remain on the unprocessed fragment list.

FIG. 5 illustrates the process of finding the largest texture fragment that includes the upper-left pixel of an unprocessed fragment grabbed from the unprocessed fragment list, block 130 of FIG. 3. First, at block 160, the width, W, and height, H, of the grabbed unprocessed fragment are determined. At block 162, a prime width, W', and height, H', are determined. W' and H' define the largest-sized fragment that can be created based on the previously retrieved rasterization rules that is not greater in either width or height than the grabbed fragment. The equations for calculating W' and H' are as follows:

$$W' = 2^i \leq W \quad (1)$$

$$H' = 2^j \leq H \quad (2)$$

where i and j are the largest integers that make these equations valid.

As will be readily appreciated by those skilled in this technology and others, equations (1) and (2) fulfill a standard rasterization requirement that the width and height dimensions be equal to a power of two (i.e., 2, 4, 8, 16, 32, 64, etc.).

At block 164, if W' of the grabbed fragment is not equal to W and the value of twice W' minus W is less than a predefined texture waste threshold value, TW, W' is doubled. At block 166 steps identical to those performed in block 164 are performed for the height of the grabbed fragment. Then, at decision block 168, the process determines if the rasterization rules allow only square textures to be developed. If square textures are not required, the W' and H' values determined in steps 162–166 are compared to the predefined minimum and maximum width and height values (WMIN, WMAX, HMIN, HMAX). More specifically, at block 170, if W'>WMAX, W' is set equal to WMAX; and if H'>HMAX, H' is set equal to HMAX. At block 172, if W'<WMIN, W' is set equal to WMIN; and if H'<HMIN, H' is set equal to HMIN. After these adjustments are complete, the process returns to the process illustrated in FIG. 4 and described above at the point where the texture image fragment defined by W' and H' is added to the texture image fragment list (block 132).

Returning to decision block 168, if the rasterization rules require square textures, a test is made at decision block 174 to determine if the following is true:

$$|H' - W'| < TW \quad (3)$$

If the test made in decision block 174 is not true, H' and W' are both set equal to the larger of the two values and the process continues to the steps described above for blocks 170 and 172. See block 176. If the test made in decision block 174 is true, a test is made at decision block 178, to determine if the following is true:

$$|H' - W'| = TW \quad (4)$$

If the test made in decision block 178 is true, H' and W' are set equal to TW and the process cycles to blocks 170 and 172. See block 180. If the test made in decision block 178 is not true, H' and W' are both set equal to the smaller of the two values and the process cycles to blocks 170 and 172. See block 182. The portion of the process illustrated in blocks 174–182 insure that square fragments are created based on the predefined value of TW.

Figure 6A:
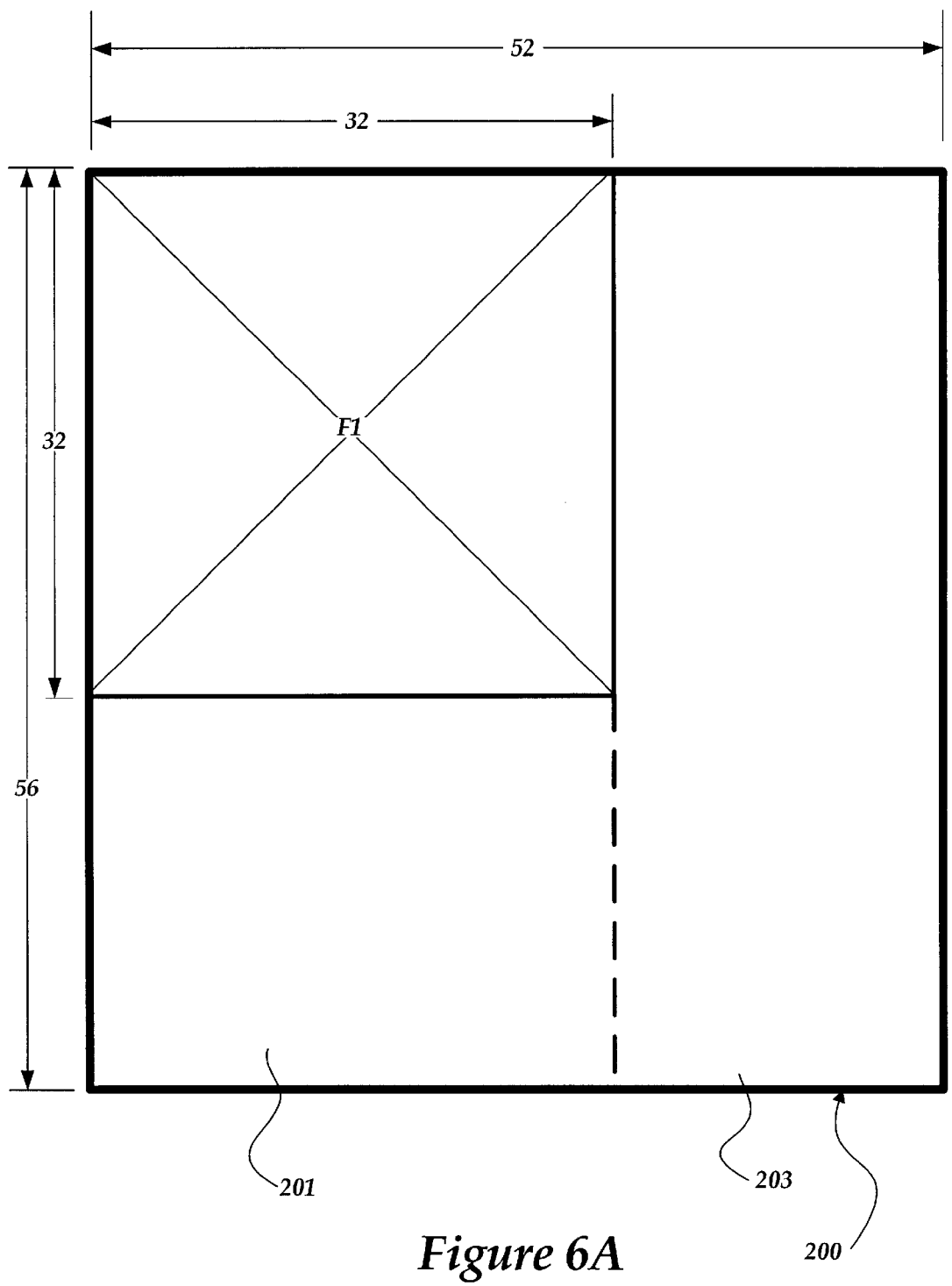
FIGS. 6A–6D are a series of views depicting the processes illustrated in FIGS. 4 and 5.
Figure 6B:
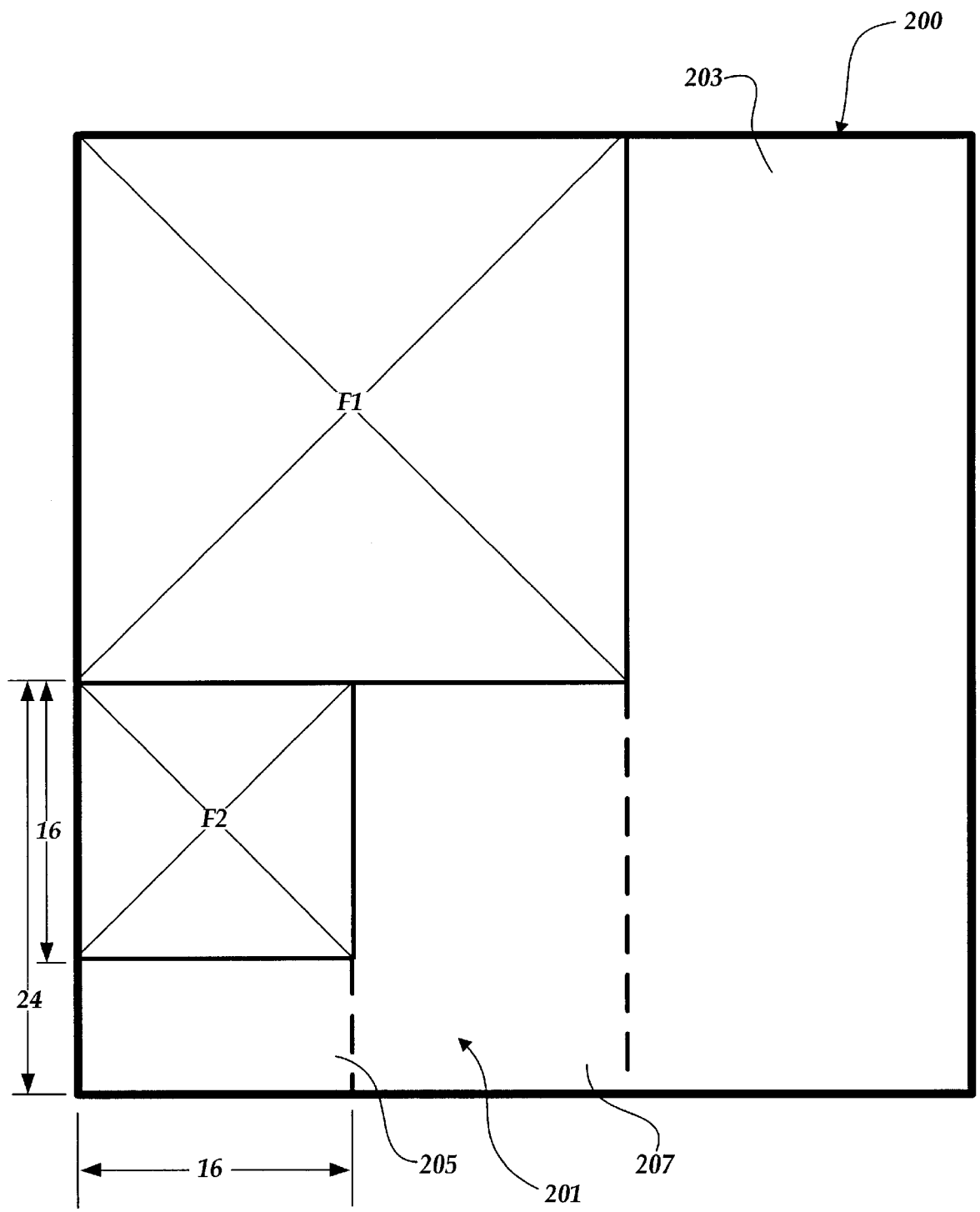
Figure 6C:
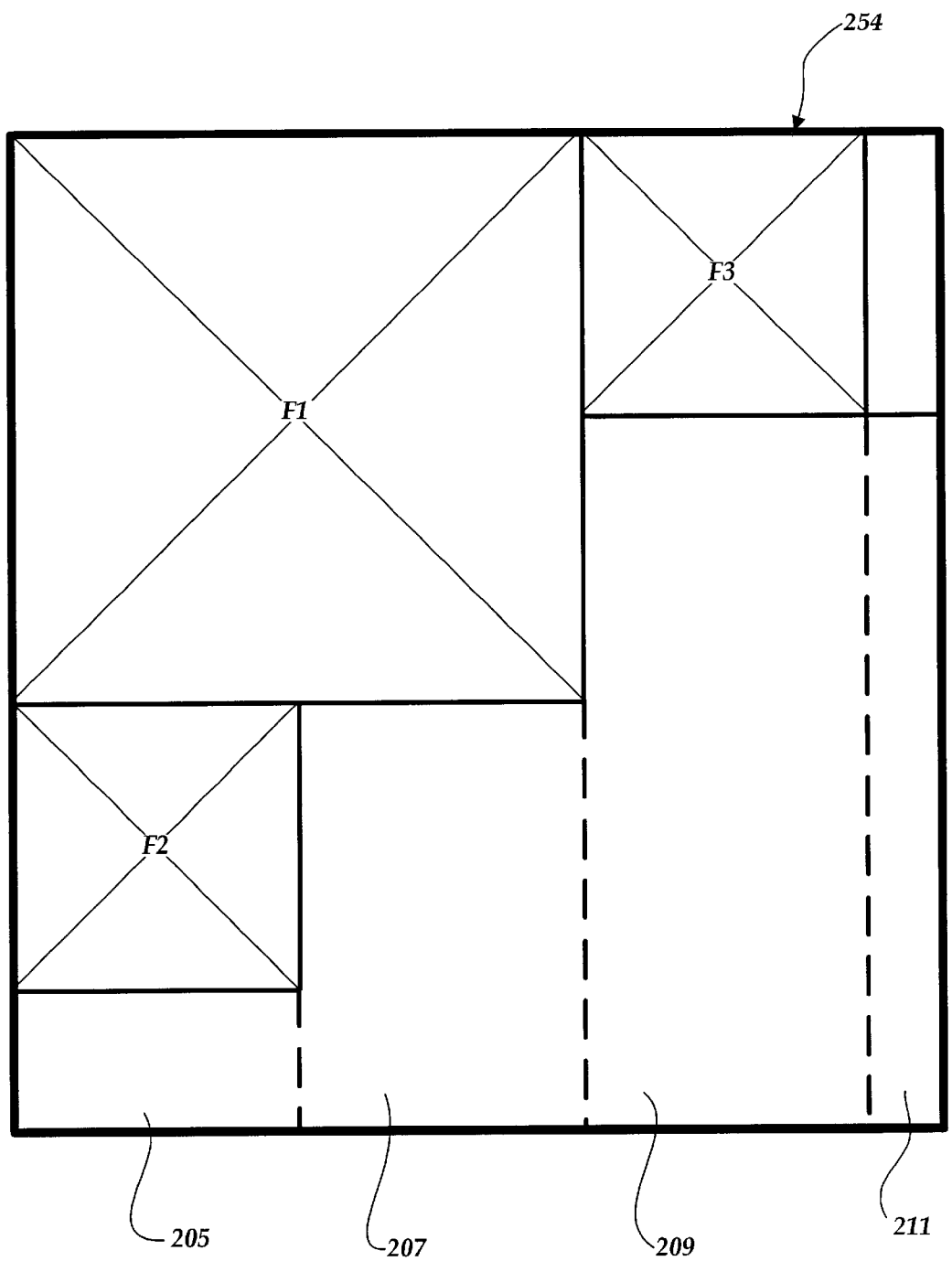

FIGS. 6A–6D are a sequence of views that pictorially illustrate the process illustrated in FIGS. 4 and 5 and described above for an arbitrary-sized texture 200. The arbitrary size is 52 pixels wide by 56 pixels high. As shown in FIG. 6A, during the first pass through blocks 130–138, a first texture fragment, designated F1, is determined. The foregoing process rules place F1 in the upper left-hand corner of the texture 200 and gives F2 a W' value of 32 pixels and an H' value of 32 pixels. Removing F1 from the texture 200 leaves two rectangles. One of the rectangles 201 lies below F1 and the other rectangle lies to the right of F1. Assuming the lower rectangle 201 is added to the unprocessed fragment list first, this rectangle is examined during the next pass through blocks 130–138. During this pass a second texture fragment, designated F2 (FIG. 6B) is determined. The foregoing process rules place F2 in the upper left-hand corner of the rectangle 201 being examined and gives F2 a W' value of 16 pixels and an H' value of 16 pixels. Removing F2 from rectangle 201 leaves two new rectangles 205 and 207.

Figure 6D:
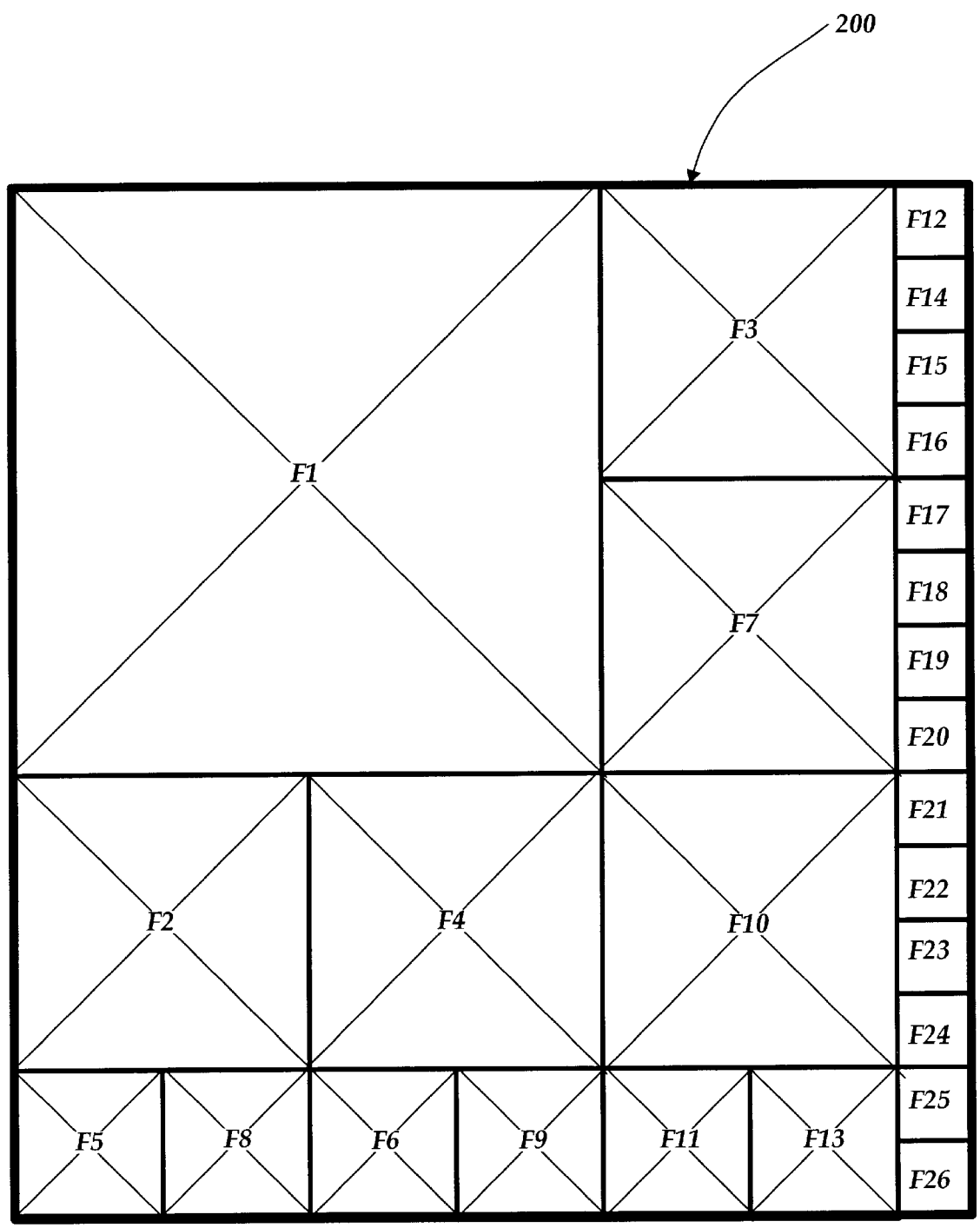

The rectangle examined during the next pass through blocks 130–138 is the one to the left of F2, i.e., rectangle 203. During this pass, a third texture fragment, designated F3 (FIG. 6C), is determined. The foregoing process rules place F3 in the upper left-hand corner of rectangle 203 being examined and gives F3 a W' value of 16 pixels and an H' value of 16 pixels. Removing F3 from rectangle 203 leaves two new rectangles 209 and 211. This process continues until all of the area of the texture 200 is covered by a texture fragment, as shown in FIG. 6D.

FIGS. 6A–6D and the foregoing description assume that TW is very small, i.e., near zero. Increasing TW results in fewer fragments being generated, at the cost of using more texture memory. In systems employing the invention that have a reasonably plentiful supply of texture memory available a TW value of 128 is preferred. In contrast, in systems employing the invention that have a scarce supply of texture memory available a TW value of 16 is preferred.

FIG. 7 illustrates a preferred process for breaking up the surface geometries to make surface geometry fragments that match the texture fragments contained in the texture fragment list (block 102 of FIG. 3) and reconstitute the mesh of polygons, i.e., the triangles, that define the surface geometries that are divided by the boundaries between texture fragments. The divided polygons are reconstituted as smaller sized polygons shaped because polygon shapes, such as triangles, are the shapes accepted by contemporary 3D rendering engines. First at block 210, the boundaries of the texture fragments in the texture fragment list are applied to a corresponding surface geometry of the three-dimensional model. As well know to those skilled in the art of three-dimensional image rendering, each vertex of a mesh, such as an array of triangles, that defines a surface geometry is described by a set of values, such as three-dimensional and texture coordinate values and material properties. Because at least some of the boundaries between texture fragments will divide one or more of the surface geometry triangles, some of the triangles must be redefined in order for the surface geometries to be properly fragmented. In this regard, next, at block 212, the intersection points of the texture fragment boundaries and the edges of the surface geometry triangles are determined. Then, at block 214, new smaller triangular elements are created between prior triangular element vertices and the determined intersection points. The newly created smaller triangular elements are saved and the triangular elements that were divided by the texture fragment boundaries are removed. See block 216.

Figure 8:
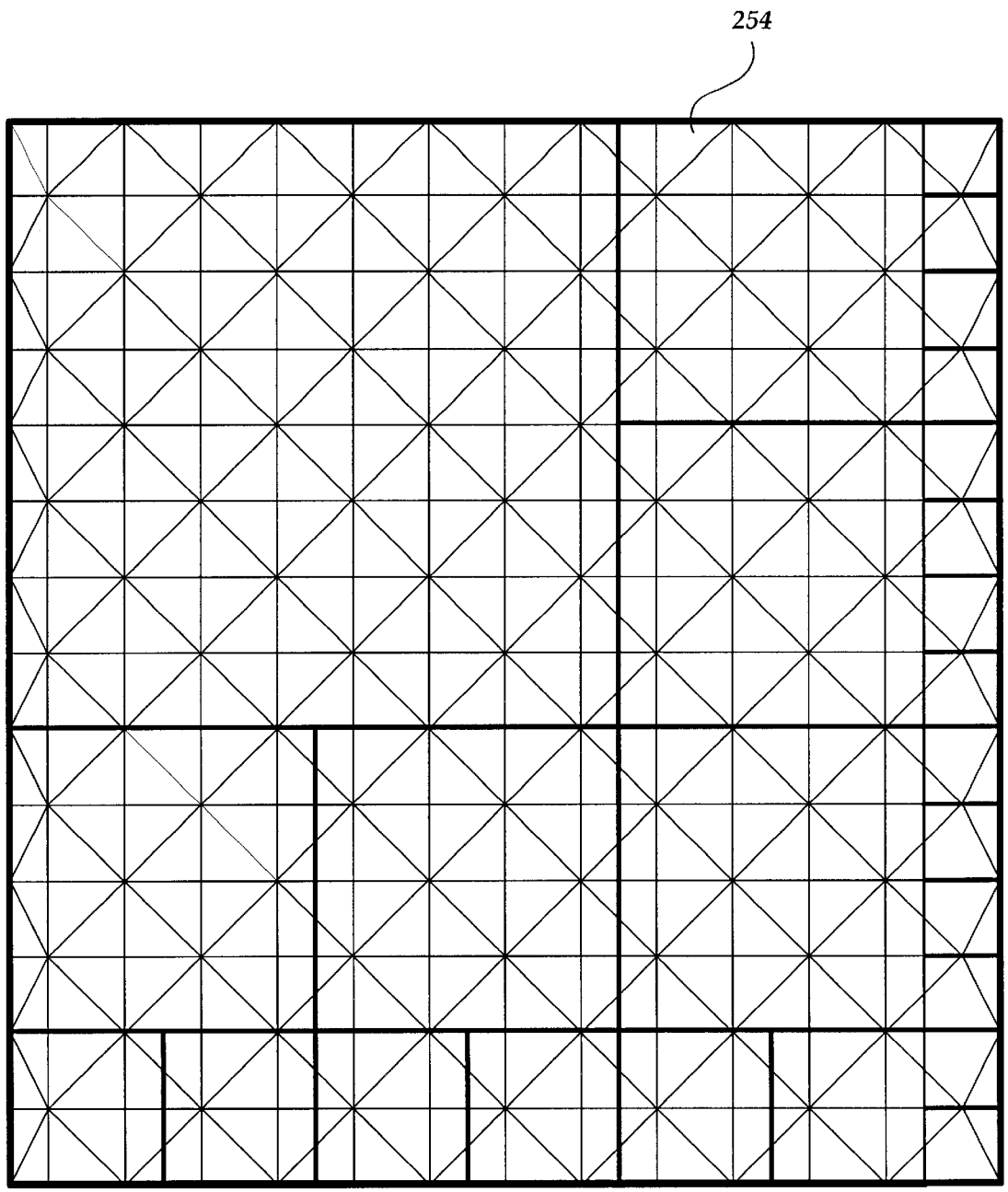
FIG. 8 is a diagram illustrating a mesh of polygons, namely triangles, that define a geometric surface.
Figure 9:
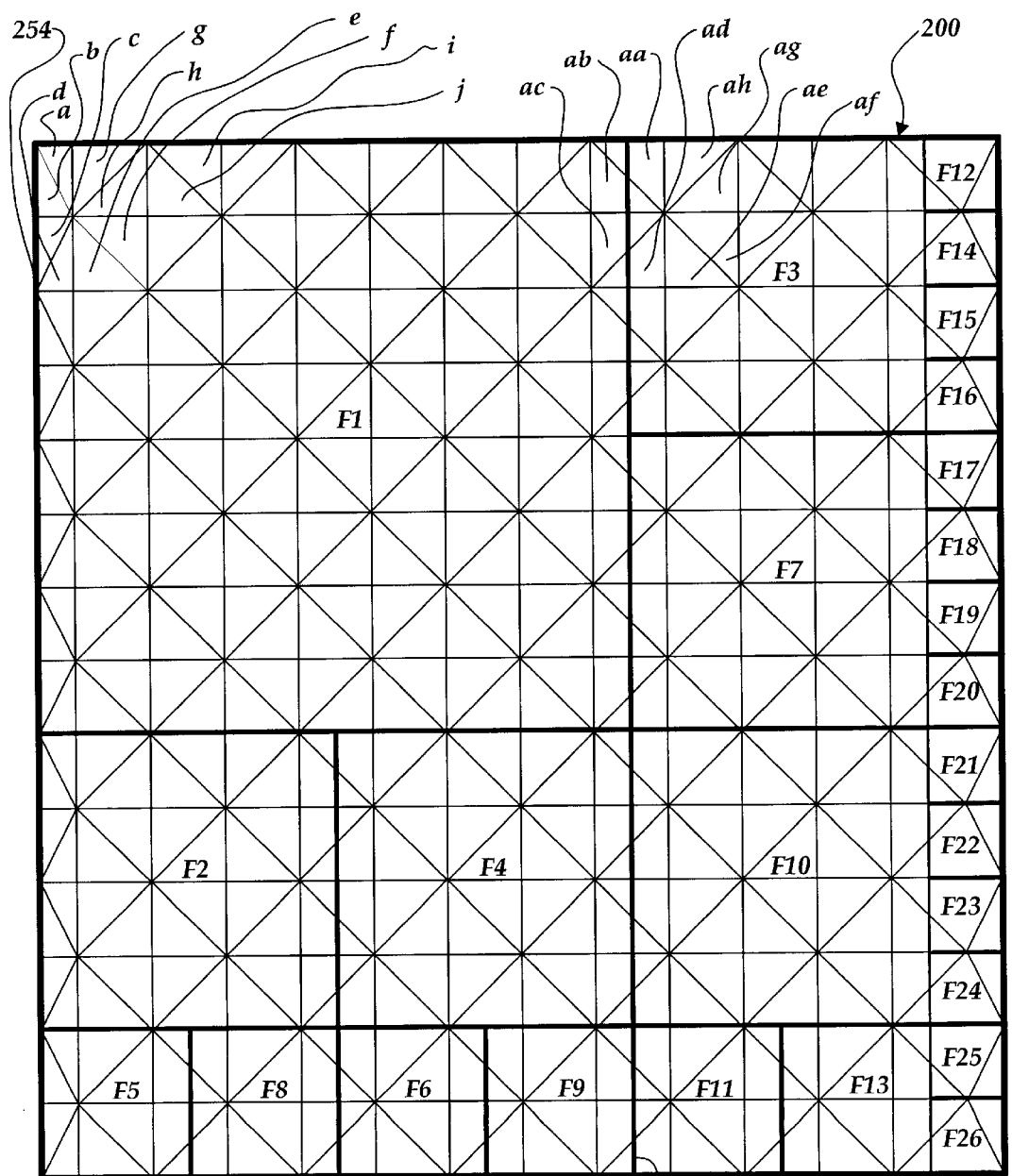
FIG. 9 is a flow diagram illustrating the mesh of triangles illustrated in FIG. 8 that define a geometric surface overlaid with corresponding texture fragments.
Figure 10:
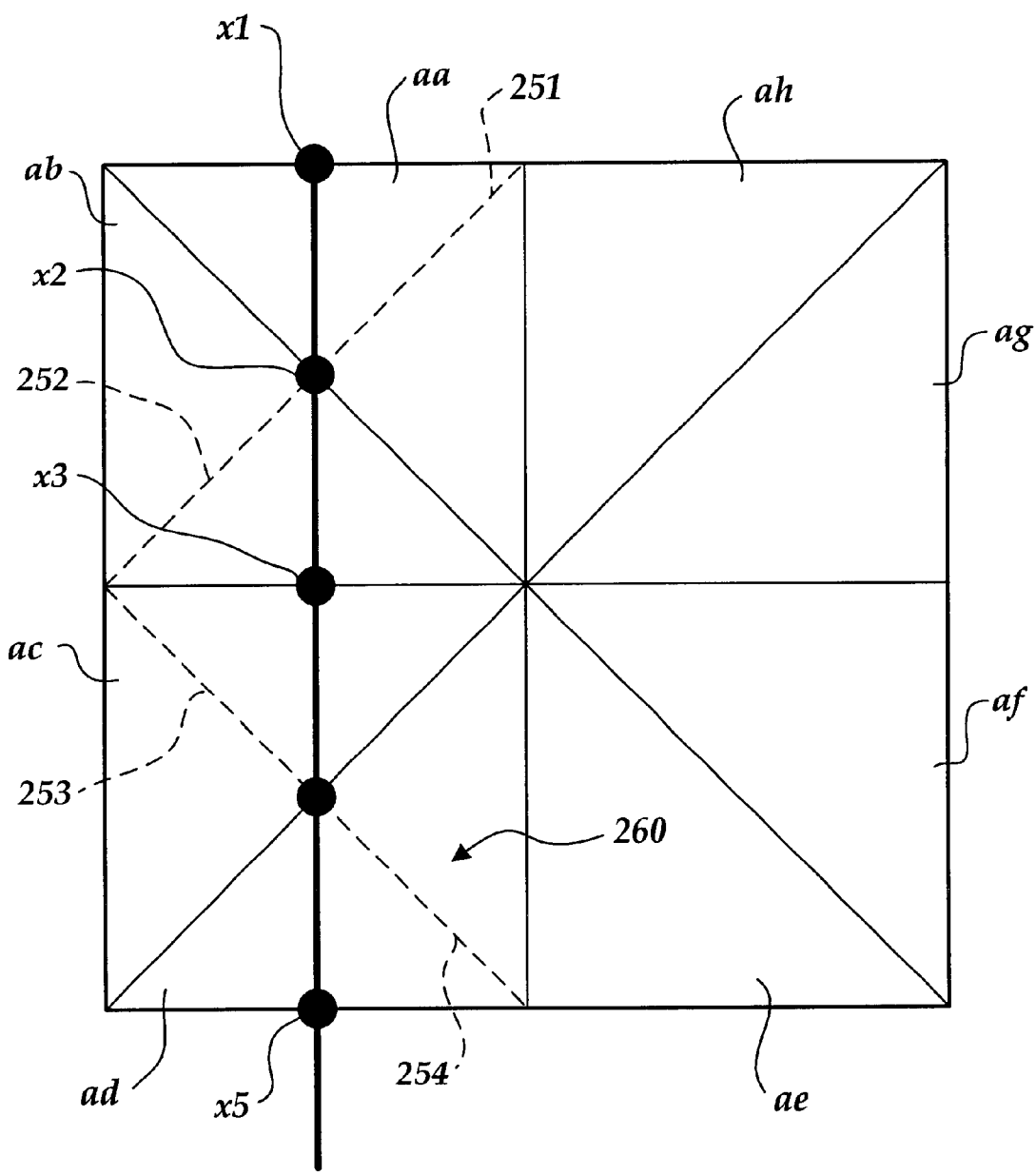
FIG. 10 is an enlarged portion of FIG. 9.

FIG. 8 illustrates an exemplary geometric surface 254 defined by a plurality of triangles a, b, c, d, . . . The geometric surface 254 is sized similar to the texture 200 illustrated in FIGS. 6A–6D and described above. FIG. 9 illustrates the texture 200 overlying the geometric surface 254. As noted above, some of the triangles, such as aa, ab, ac, and ad, are divided by the boundary, indicated by a line 250, between F1 and F3. This area of FIG. 9 is enlarged in FIG. 10. More specifically, FIG. 10 illustrates in more detail how new triangles are created (block 214, FIG. 7) as a result of the boundary of texture fragments dividing some of the array of triangles that define a portion of a surface geometry. The texture fragment boundary, indicated by the line 250, divides the four geometric surface triangles aa, ab, ac, and ad into two parts. One part is still triangular shaped and the other part is not triangular shaped. An intersection point, x1, x2, x3, x4, and x5, is created where the boundary line intersects the edges of the divided surface geometry triangles aa, ab, ac, and ad. As shown by dashed lines 251, 252, 253, and 254 in FIG. 10, the vertices of some of the original triangles and some of the intersection points, namely, intersection points 2 and 4, are used to define new triangles. For example, line 250 separates triangular element aa into two parts. A line 251 drawn from intersection point x2 to a common vertex between triangular elements aa and ah divides the non-triangular part of triangle aa into two new, smaller triangles. Thus, original triangle aa is divided into three smaller triangles, one lying within the surface geometry covered by F1 and the other two lying within the surface geometry covered by F3. After the new, smaller triangles are created and their vertices are defined, the new, smaller triangles are stored in place of the original, large triangles. As noted above, this redefining of boundary region triangles creates mesh elements, in this case triangles, that are configured to be accepted by the chosen 3D rendering engine. After being formed, the texture coordinates are remapped to the associated geometric surface fragment.

While the preferred embodiment of the invention has been illustrated and described, it will be appreciated that various changes can be made therein without departing from the spirit of the invention. In this regard, the foregoing has described a generic embodiment of the invention wherein the mesh that defines the geometric surfaces comprises a plurality of triangles of the type acceptable by contemporary, commercially available 3D rendering engines. The generic embodiment in essence employs an arbitrary-sized mesh with texture provided as an input. In the case of known primitives, such as a sphere, cone, box, sheet, cylinder, pyramid, torus, etc., there is an alternative way of implementing the invention. Rather than building a mesh big enough to cover an entire surface of the primitive (the entire surface of a sphere, for example) and then decomposing the surface in accordance with the texture fragments, the texture fragments can be analyzed in sequence and triangles (or other polygons) assigned to the texture fragments. This alternative avoids the need to reconstitute polygons, i.e., triangles, divided by the boundaries of texture fragments.

While the best way of carrying out the invention is presently believed to be a texture into fragments and using the fragments to dissect a surface defined by an array of triangles, as noted above, if the surface geometry mesh is defined by some other polygon shapes, or in some other manner, the surface geometry can be divided into triangles and the invention applied in the manner described above. Alternatively, the "other" polygon shapes divided by texture fragment borders can be converted into smaller similar-shaped polygons.

While the invention has been described for use in connection with geometric surfaces that are defined by a mesh of polygons, i.e., triangles, the invention can also be used with geometric surfaces defined in other ways, by nonuniform, rational B-splines (NURBS), for example. As well known to those skilled in the computer graphics art, a NURB gives a mathematical description of a curved shape in 3D space. In order to implement the invention in an environment where 3D model surfaces are defined by NURBS, the process would have to determine if a particular NURB lies entirely within a texture fragment. If so, the NURB would be assigned to the texture fragment. If the NURB crossed two or more texture fragments, the NURB would have to be decomposed into smaller NURBS sized to lie entirely within a single texture fragment.

Finally, while the foregoing description breaks up texture into texture fragments starting in the upper-left corner of the texture, obviously, this starting position is arbitrary. Other starting positions can be chosen. Likewise, while it is desirable to create the largest texture fragment that can be created based on rasterization limitations, in some instances it may be desirable to limit the size of fragments to some predetermined maximum value.

Hence, within the scope of the appended claims it is to be understood that the invention can be practiced otherwise than as specifically described herein.

The embodiments of the invention in which an exclusive property or privilege is claimed are defined as follows:

1. A method for mapping a texture onto the geometric surface of a three-dimensional model, said method comprising:
   (a) fragmenting the texture into texture fragments based on predefined rasterization requirements;
   (b) fragmenting the geometric surface of the three-dimensional model into geometric surface fragments based on the texture fragments;
   (c) associating each texture fragment with a corresponding geometric surface fragment;
   (d) mapping the texture fragments to the geometric surface fragments based upon the association; and
   (e) displaying the three-dimensional model with the texture fragments mapped to the geometric surface.

2. The method of claim 1, wherein fragmenting the texture into texture fragments based on predefined rasterization requirements comprises:
   (a) adding the dimensions of the texture to an unprocessed fragment list;
   (b) finding the optimum-sized texture fragment for the entered dimensions based on the rasterization requirements;
   (c) adding the found optimum-sized texture fragment to a texture fragment list;
   (d) forming one or more rectangles from the area not assigned to any found optimum-sized texture fragment;
   (e) adding the formed one or more rectangles as fragments to the unprocessed fragment list;
   (f) finding the optimum-sized texture fragment for a fragment in the unprocessed fragment list based on the rasterization requirements; and
   (g) repeating c–f until all portions of the texture are assigned to an optimum-sized texture fragment in the texture fragment list.

3. The method of claim 2, wherein finding the optimum-sized texture fragment for a fragment in the unprocessed fragment list based on the rasterization requirements further comprises:
   (a) determining a first width as the largest power of two that is less than or equal to the width of the fragment in the unprocessed fragment list and determining a first height as the largest power of two that is less than or equal to the height of the fragment in the unprocessed fragment list;
   (b) if double the first width minus the width of the fragment in the unprocessed fragment list is less than a predefined texture waste value, making the first width double its originally determined value;

(c) if double the first height minus the height of the fragment in the unprocessed fragment list is less than the predefined texture waste value, making the first height double its originally determined value;

(d) if square textures are not a preset rasterization requirement and the first width or height are outside preset rasterization requirement limits, setting the texture fragments' width or height to the closest preset rasterization requirement limit;

(e) if square textures are a preset rasterization requirement and the absolute value of the first width minus the first height is less than the predefined texture waste value, setting the first width and height to the larger of the two and, if the set first width or height is outside preset rasterization requirement limits, setting the texture fragments width or height to the closest preset rasterization requirement limit;

(f) if square textures are a preset rasterization requirement and the absolute value of the first width minus the first height is equal to the predefined texture waste value, setting the first width and height to the predefined texture waste value and, if the set first width or height is outside preset rasterization requirement limits, setting the texture fragments width or height to the closest preset rasterization requirement limit; and (g) if square textures are a preset rasterization requirement and the absolute value of the first width minus the first height is greater than the predefined texture waste value, setting the first width and height to the smaller of the two and, if the set first width or height is outside preset rasterization requirement limits, setting the texture fragments width or height to the closest preset rasterization requirement limit.

4. The method of claim 1, wherein the geometric surface of the three-dimensional model is defined by triangles and wherein fragmenting the geometric surface of the three-dimensional model into geometric surface fragments based on the texture fragments further comprises:

(a) applying the boundaries of the texture fragments to the surface geometry;

(b) determining the points of intersection between the triangles of the geometric surface and the applied boundaries;

(c) creating new triangles from the determined intersection points and pre-existing vertices of the triangles;

(d) saving the created triangles; and (e) removing the triangles having points of intersection between the triangles of the geometric surface and the applied boundaries by the newly created triangles.

5. A computer readable medium containing instructions which, when executed by a computer, cause the computer to perform the method of claim 1.

6. A computer readable medium containing instructions which, when executed by a computer, cause the computer to perform the method of claim 2.

7. A computer readable medium containing instructions which, when executed by a computer, cause the computer to perform the method of claim 3.

8. A computer readable medium containing instructions which, when executed by a computer, cause the computer to perform the method of claim 4.

9. A system for mapping a texture onto the geometric surface of a three-dimensional model, said system comprising:

a display device;

a memory; and a processor with hardware and software components for:

(a) fragmenting the texture into texture fragments based on predefined rasterization requirements;

(b) fragmenting the geometric surface of the three-dimensional model into geometric surface fragments based on the texture fragments;

(c) associating each texture fragment with a corresponding geometric surface fragment;

(d) mapping the texture fragments to the geometric surface fragments based upon the association; and (e) displaying the three-dimensional model with the texture fragments mapped to the geometric surface.

10. The system of claim 9, wherein the processor fragments the texture into texture fragments based on the rasterization requirements by:

(a) adding the dimensions of the texture to an unprocessed fragment list;

(b) finding the optimum-sized texture fragment for the entered dimensions based on the rasterization requirements;

(c) adding the found optimum-sized texture fragment to a texture fragment list;

(d) forming one or more rectangles from the area not assigned to any found optimum-sized texture fragment;

(e) adding the formed one or more rectangles as fragments to the unprocessed fragment list;

(f) finding the optimum-sized texture fragment for a fragment in the unprocessed fragment list based on the rasterization requirements; and (g) repeating c–f until all portions of the texture are assigned to an optimum-sized texture fragment in the texture fragment list.

11. The system of claim 10, wherein the processor finds the optimum-sized texture fragment for a fragment in the unprocessed fragment list based on the rasterization requirements by:

(a) determining a first width as the largest power of two that is less than or equal to the width of the fragment in the unprocessed fragment list and determining a first height as the largest power of two that is less than or equal to the height of the fragment in the unprocessed fragment list;

(b) if double the first width minus the width of the fragment in the unprocessed fragment list is less than a predefined texture waste value, making the first width double its determined value;

(c) if double the first height minus the height of the fragment in the unprocessed fragment list is less than the predefined texture waste value, making the first height double its determined value;

(d) if square textures are not a preset rasterization requirement and the first width or height is outside preset rasterization requirement limits, setting the texture fragments width or height to the closest preset rasterization requirement limit;

(e) if square textures are a preset rasterization requirement and the absolute value of the first width minus the first height is less than the predefined texture waste value, setting the first width and height to the larger of the two and, if the set first width or height is outside preset rasterization requirement limits, setting the texture fragments width or height to the closest preset rasterization requirement limit;

(f) if square textures are a preset rasterization requirement and the absolute value of the first width minus the first height is equal to the predefined texture waste value, setting the first width and height to the predefined texture waste value and, if the set first width or height is outside preset rasterization requirement limits, setting the texture fragments width or height to the closest preset rasterization requirement limit; and (g) if square textures are a preset rasterization requirement and the absolute value of the first width minus the first height is greater than the predefined texture waste value, setting the first width and height to the smaller of the two and, if the set first width or height is outside preset rasterization requirement limits, setting the texture fragments width or height to the closest preset rasterization requirement limit.

12. The system of claim 9, wherein the geometric surface of the three-dimensional model is defined by triangles and wherein the processor fragments the geometric surface of the three-dimensional model into geometric surface fragments based on the texture fragments by:

(a) applying the boundaries of the texture fragments to the surface geometry;

(b) determining the points of intersection between the triangles of the geometric surface and the applied boundaries;

(c) creating new triangles from the determined intersection points and pre-existing vertices of the triangles;

(d) saving the created triangles; and (e) removing the triangles having points of intersection between the triangles of the geometric surface and the applied boundaries by the newly created triangles.

* * * * *

UNITED STATES PATENT AND TRADEMARK OFFICE
CERTIFICATE OF CORRECTION

PATENT NO.    : 6,362,819 B1
DATED         : March 26, 2002
INVENTOR(S)   : K.K. Dalal et al.

It is certified that error appears in the above-identified patent and that said Letters Patent is hereby corrected as shown below:

Column 1,
Line 25, "hardware of software)" should read -- hardware or software) --

Column 2,
Line 31, "geometry is" should read -- geometry, is --

Column 3,
Line 49, "fragments are" should read -- fragments is --

Column 4,
Line 35, "that helps" should read -- that help --

Column 6,
Line 34, "and that pixel" should read -- and require that pixel --

Column 7,
Line 47, "178, to" should read -- 178 to --
Line 57, "174-182 insure" should read -- 174-182 insures --

Column 8,
Line 9, "16 pixels." should read -- 16 pixels. --
Line 27, "able a" should read -- able, a --
Line 29, "available a" should read -- available, a --
Line 37, "polygons shaped" should read -- polygon shapes --
Line 42, "well know" should read -- well known --

Column 9,
Line 51, "to be a texture" should read -- to be breaking a texture --

Column 11,
Line 10, "fragments' width" should read -- fragments width --
Lines 53-55, delete in its entirety Claim 5 and substitute therefor:
-- 5.   A computer readable medium containing instructions which, when executed by a computer, cause the computer to map a texture onto the geometric surface of a three-dimensional model, said texture mapping comprising:
(a)     fragmenting the texture into texture fragments based on predefined rasterization requirements;
(b) fragmenting the geometric surface of the three-dimensional model into geometric surface fragments based on the texture fragments;

UNITED STATES PATENT AND TRADEMARK OFFICE
CERTIFICATE OF CORRECTION

| | | |
|---|---|---|
| PATENT NO. | : 6,362,819 B1 | |
| DATED | : March 26, 2002 | |
| INVENTOR(S) | : K.K. Dalal et al. | |

It is certified that error appears in the above-identified patent and that said Letters Patent is hereby corrected as shown below:

Column 11 (cont'd),
(c) associating each texture fragment with a corresponding geometric surface fragment;
(d) mapping the texture fragments to the geometric surface fragments based upon the association; and
(e) displaying the three-dimensional model with the texture fragments mapped to the geometric surface. --

Lines 56-58, delete in its entirety Claim 6 and substitute therefor:
-- 6. A computer readable medium containing instructions which, when executed by a computer, cause the computer to map a texture onto the geometric surface of a three-dimensional model as claimed in Claim 5, wherein fragmenting the texture into texture fragments based on predefined rasterization requirements comprises:
(a) adding the dimensions of the texture to an unprocessed fragment list;
(b) finding the optimum-sized texture fragment for the entered dimensions based on the rasterization requirements;
(c) adding the found optimum-sized texture fragment to a texture fragment list;
(d) forming one or more rectangles from the area not assigned to any found optimum-sized texture fragment;
(e) adding the formed one or more rectangles as fragments to the unprocessed fragment list;

(f) finding the optimum-sized texture fragment for a fragment in the unprocessed fragment list based on the rasterization requirements; and
(g) repeating c-f until all portions of the texture are assigned to an optimum-sized texture fragment in the texture-fragment list --

Lines 59-61, delete in its entirety Claim 7 and substitute therefor:
-- 7. A computer readable medium containing instructions which, when executed by a computer, cause the computer to map a texture onto the geometric surface of a three-dimensional model as claimed in claim 6, wherein finding the optimum-sized texture fragment for a fragment in the unprocessed fragment list based on the rasterization requirements further comprises:
(a) determining a first width as the largest power of two that is less than or equal to the width of the fragment in the unprocessed fragment list and determining a first height as the largest power of two that is less than or equal to the height of the fragment in the unprocessed fragment list;
(b) if double the first width minus the width of the fragment in the unprocessed fragment list is less than a predefined texture waste value, making the first

UNITED STATES PATENT AND TRADEMARK OFFICE
CERTIFICATE OF CORRECTION

PATENT NO.   : 6,362,819 B1
DATED        : March 26, 2002
INVENTOR(S)  : K.K. Dalal et al.

It is certified that error appears in the above-identified patent and that said Letters Patent is hereby corrected as shown below:

Column 11 (cont'd),
width double its originally determined value;
(c)     if double the first height minus the height of the fragment in the unprocessed fragment list is less than a predefined texture waste value, making the first height double its originally determined value;
(d)     if square textures are not a preset
rasterization requirement and the first width or height are outside preset rasterization requirement limits, setting the texture fragments' width or height to the closest preset rasterization requirement limit;
(e)     if square textures are a preset rasterization requirement and the absolute value of the first width minus the first height is less than the predefined texture waste value, setting the first width and height to the larger of the two and, if the set first width and height is outside preset rasterization requirement limits, setting the texture fragments' width or height to the closest preset rasterization requirement limit;
(f)     if square textures are a preset rasterization requirement and the absolute value of the first width minus the first height is equal to the predefined texture waste value, setting the first width and height to the predefined texture waste value and, if the set first width and height is outside preset rasterization requirement limits, setting the texture fragments' width or height to the closest preset rasterization requirement limit; and
(g)     if square textures are a preset rasterization requirement and the absolute value of the first width minus the first height is greater than the predefined texture waste value, setting the first width and height to the smaller of the two and, if the set first width or height is outside preset rasterization requirement limits; setting the texture fragments' width or height to the closest preset rasterization requirement limit. --

UNITED STATES PATENT AND TRADEMARK OFFICE
CERTIFICATE OF CORRECTION

PATENT NO. : 6,362,819 B1
DATED : March 26, 2002
INVENTOR(S) : K.K. Dalal et al.

It is certified that error appears in the above-identified patent and that said Letters Patent is hereby corrected as shown below:

Column 11 (cont'd),
Lines 62-64, delete in its entirety Claim 8 and substitute therefor:
-- 8. A computer readable medium containing instructions which, when executed by a computer, cause the computer to map a texture onto the geometric surface of a three-dimensional model as claimed in claim 5, wherein the geometric surface of the three-dimensional model is defined by triangles and wherein fragmenting the geometric surface of the three-dimensional model into geometric surface fragments based on the texture fragments further comprises:
(a) applying the boundaries of the texture fragments to the surface geometry;
(b) determining the points of intersection between the triangles of the geometric surface and the applied boundaries;
(c) creating new triangles from the determined intersection points and pre-existing vertices of the triangles;
(d) saving the created triangles; and
(e) removing the triangles having points of intersection between the triangles of the geometric surface and the applied boundaries by the newly created triangles. --

Signed and Sealed this

Twenty-sixth Day of April, 2005

JON W. DUDAS
*Director of the United States Patent and Trademark Office*